D. H. FITCH.
TELEPHONE.
No. 249,605. Patented Nov. 15, 1881.
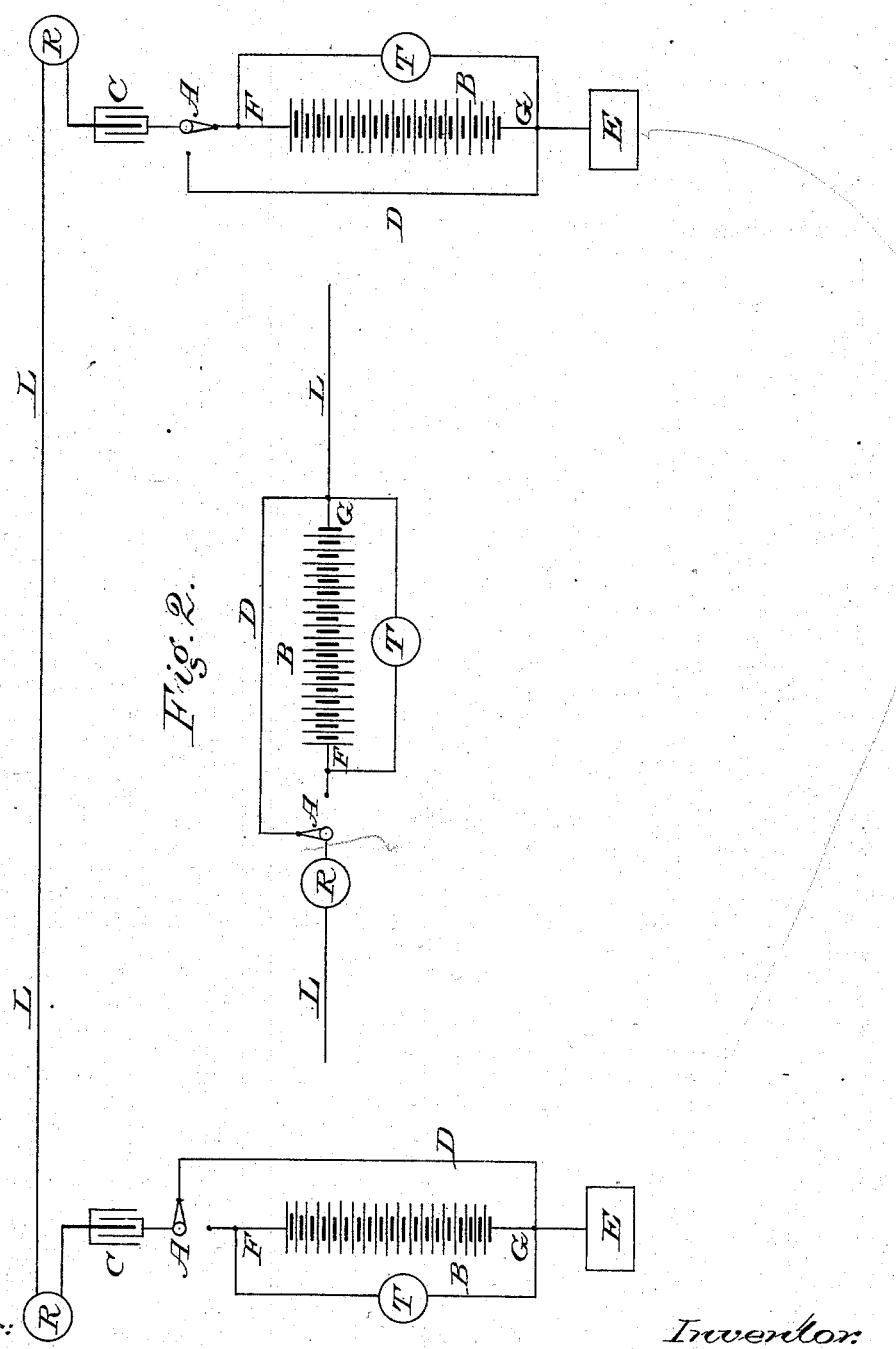

UNITED STATES PATENT OFFICE.

DERICK H. FITCH, OF TUSCOLA, ILLINOIS.

TELEPHONE.

SPECIFICATION forming part of Letters Patent No. 249,605, dated November 15, 1881.

Application filed April 24, 1879.

*To all whom it may concern:*

Be it known that I, DERICK H. FITCH, of Tuscola, in the county of Douglas and State of Illinois, have invented a new and useful Improvement in Telephones, of which the following is a specification.

This invention relates to a method of transmitting by static induction.

The object of my invention is to produce a battery-transmitter by static induction, which will induce upon a line reciprocating currents of variable tension, quantity, and duration similar to the currents which are induced by telephone-transmitters, which are worked upon the principle of magneto-electric induction or current induction, and by which currents of equal tension in both directions and of great amplitude and force can be transmitted.

This invention consists in the arrangement of the telephone line, receivers, condensers, batteries, and transmitters, as shown in the accompanying drawings, in which similar letters of reference indicate like parts.

Figure 1 shows the arrangement of the line and terminal offices; Fig. 2, the arrangement at intermediate offices.

The line L is insulated from the earth by the condensers C.

The telephone-receivers R may be any of the known forms of telephone-receivers.

The properties of the condensers C are well known.

The batteries B may be any of the known forms of galvanic battery, and may consist of any number of cells.

The transmitters T may be any of the forms of telephone-transmitters known as "battery-transmitters," of which Edison's carbon disk is an example, or any other means by which resistance can be increased or diminished by vocal or other sounds.

The switch-button A is for connecting the line and condenser to the direct wire D, and disconnecting the battery and transmitter when receiving communications; F and G, points of contact of wires leading from each side of the batteries to the transmitters; E, the ground-plates.

The principle upon which this method of transmission is worked is as follows: If the circuit is opened at T the condensers will be charged to the full tension of the battery and a momentary current of the same tension will be induced upon the line. If the circuit is then closed at T with no resistance the current from the battery will flow through the wire F T G, and the condensers and line will be discharged and a momentary current equal to the first will flow in the opposite direction on the line. If the resistance at T be varied between these extremes the charge in the condensers will vary accordingly in proportion to the resistance, and corresponding reciprocating currents of variable tension, quantity, and duration will, in consequence, be induced upon the line.

What I claim is—

A telephone-line, including telephonic receivers, in combination with condensers insulating the line from the ground or earth, a local circuit comprising a battery and a transmitter, and a ground or line wire connecting with said local circuit on one side of the battery, and a switch for connecting the condensers with the other side of the battery for transmitting and for disconnecting or shunting the battery and transmitter while receiving.

DERICK H. FITCH.

Witnesses:
N. A. EDDY,
C. W. HUTCHCLIFFE.